United States Patent
Xu

(10) Patent No.: US 6,296,497 B1
(45) Date of Patent: Oct. 2, 2001

(54) THREE-PHASE ELECTRICAL CABLE PLUG-TYPE CONNECTOR

(76) Inventor: Xiaoying Xu, Luoyulu, Wuchang District, Wuhan City, Hubei 430070 (CN)

( * ) Notice: Subject to any disclaimer, the term of this patent is extended or adjusted under 35 U.S.C. 154(b) by 0 days.

(21) Appl. No.: 09/486,433

(22) PCT Filed: Aug. 21, 1998

(86) PCT No.: PCT/CN98/00169

§ 371 Date: Jun. 16, 2000

§ 102(e) Date: Jun. 16, 2000

(87) PCT Pub. No.: WO99/12239

PCT Pub. Date: Mar. 11, 1999

(30) Foreign Application Priority Data

Aug. 28, 1997 (CN) .................................................. 97108195

(51) Int. Cl.[7] ..................................................... H01R 4/58
(52) U.S. Cl. ............................. 439/89; 439/744; 439/921
(58) Field of Search ..................................... 439/650, 654, 439/921, 848, 682, 685, 89, 90, 91, 88, 891, 744

(56) References Cited

U.S. PATENT DOCUMENTS

| | | |
|---|---|---|
| 2,758,291 | 8/1956 | Richards . |
| 2,828,473 | 3/1958 | High . |
| 4,571,018 * | 2/1986 | Annoot ................................. 439/650 |
| 5,226,838 * | 7/1993 | Hsu ...................................... 439/654 |

FOREIGN PATENT DOCUMENTS

| | | |
|---|---|---|
| 2064952 | 10/1990 | (CN) . |
| 2255107 | 5/1997 | (CN) . |

* cited by examiner

*Primary Examiner*—Khiem Nguyen
*Assistant Examiner*—Javaid Nasri
(74) *Attorney, Agent, or Firm*—Ladas & Parry

(57) ABSTRACT

The invention provides a three-phase power cable plug-type connector, comprising a head body having at least two sockets, and plug-in bodies the number of which is identical with that of the sockets. The outsides of the head and plug-in bodes are insulated. The head body has on the inside thereof three intermediate conducting members. Each socket of the head body is provided therein with three insertion holes which are isolated from each other by insulating layers and assigned to the three intermediate conducting members, respectively. Each insertion hole has at its inner end a connecting seat connected to the corresponding conduction member and with an axial locking assembly. The plug-in body has three conducting plug rods and three electric-coupling devices which are isolated from each other by insulators, and further has a branch support sleeve for dividing three conducting wires. After having been inserted into the insertion holes, the three conducting plug rods are locked therein by the axial locking assemblies in the head body. Shielding layers for corresponding conducting paths of the three phases are arranged in the insulator of the head body and the plug-in bodies.

7 Claims, 5 Drawing Sheets

THREE-PHASE ELECTRICAL CABLE PLUG-TYPE CONNECTOR

FIELD OF THE INVENTION

The present invention relates to a plug-type connector for connecting the ends of two or more three-phase power cables during power cable laying.

BACKGROUND OF THE INVENTION

Chinese Utility Model No. 95237732.2 discloses a power cable plug-type connector. The known connector has a head body having at two sockets. Each socket has an insertion hole. The head body has on its an outside insulator, and has on its inside an intermediate conducting member. The conducting member is provided at its end toward each insertion hole with a locking assembly for axially locking the conducting plug rod. The locking assembly is connected at its outer end to a conducting gripper, and the conducting gripper is connected to the intermediate conducting member, thereby forming a single phase conducting path. The inner holes of the locking assembly and the conducting gripper are centered with the insertion hole. The cable connector further comprises plug-in bodies the number of which is identical with that of the sockets. Each plug-in body has on its outside insulator, at its front end a conducting plug rod, at its rear end an opening for inserting a single-phase cable, and in the middle an assembly for axially locking the conducting wire of the cable. The axial locking assembly locks the end of the cable by tipping the end. The axial locking assembly is connected at its rear end to a conducting seat, and the conducting seat is connected to the rear end of the conducting plug rod, so that the conducting wire of the cable, the axial locking assembly, the conducting seat, and the conducting plug rod form a current conducting path. When the plug-in bodies are inserted into the respective sockets of the head body, the front ends of the plug rods of the plug-in bodies are automatically locked by the axial locking assemblies in the sockets of the head body, and the reliable connection and contact are realized, thereby interconnecting all the conducting wires of single-phase cables in the sockets.

The power cable connector known from Chinese Utility Model No. 95237732.2 has the following advantages: (1) Power cable ends are connected by means of direct plug connection so that in site operation the work efficiency can be increased and the labor intensity can be decreased; (2) The prefabricated cable connectors are used for the direct plug connection of power cables so that the technological parameters are stable and reliable; (3) The tensile strength is high, the connection is reliable, and the operating condition and performance are good. However, The known power cable connector still has the following drawbacks: (1) One connector can be only used to connect one phase of a three-phase power cable. To connect all the three phases by means of the plug connection, it is necessary to use three connectors, and at the same time, it is necessary to perform a connection in which the positions of phase conductors are in a coordinated transposition because in the case of the separate connectors the electrodynamic forces appearing when the currents conduct inside the connectors must be taken into consideration. As a result, the profile of a cable connection takes up much room. (2) To complete all the plug connections of one end of a three-phase power cable, it is necessary to perform three plug operations respectively, and before such plug operations, it is necessary to remove external insulating layers up to 1.5 m of the cable ends so that the labor intensity in site operation is still high and presents the work efficiency from increasing further. (3) The locking assembly in the plug-in body for a conductor wire of a cable is an axial locking assembly. In site work, it is necessary to tip the ends of the conductor wires one by one. This operation is a little troublesome and the site work is inconvenient so that work progress is affected. (4) More material are more consumed since it is necessary to use three connectors to complete all the plug connections of three conductor wires of one end of a three-phase power cable.

SUMMARY OF THE INVENTION

An object of the invention is to provide a three-phase power cable connector so that the interconnection of three-phase power cables can be realized by only one connector.

To fulfil the object of the invention, according to the present invention, there is provided a three-phase power cable plug-type connector, comprising a head body having at least two sockets, and plug-in bodies the number of which is identical with that of said sockets, wherein: (1) said head body has on the inside thereof three intermediate conducting members which are isolated from each other by means of an insulating structure and used for electrically interconnecting conducting wires of three-phase power cables, each socket of said head body is provide therein with three insertion holes which are isolated from each other by means of the insulating structure and assigned to the three intermediate conducting members, respectively, and each insertion hole has at its inner end a connecting seat connected to the corresponding conducting member and with an axial locking assembly; (2) said plug-in body has three conducting plug rods and three electric-coupling devices which are isolated from each other by means of another insulating structure, and further has a branch support sleeve comprising a dividing body of insulating material, said dividing body having three dividing holes for dividing and receiving three conducting wire of a three-phase power cable, said electric-coupling devices are connected with three conducting plug rods and the three conducting wires, respectively, thereby electrically connecting each plug rod to its corresponding wire, and said three plug rods is used to be inserted into the three insertion holes of each socket and locked therein by the axial locking assemblies in the head body; and (3) shielding layers for corresponding conducting paths of the three phases are arranged in the insulating structures of the head body and the plug-in bodies.

The three-phase power cable connector according to the invention has advantageous results. The plug connection of an end of a three-phase power cable can be performed by only one connector. The connected cable has a small profile of the connection. Moreover, to finish connecting one end of a three-phase power cable, only one operation is needed thereby increasing the work efficiency.

BRIEF DESCRIPTION OF THE DRAWINGS

The present invention will be better understood from the following detailed description of some preferred embodiments when taken together with the accompanying drawings in which.

DETAILED DESCRIPTION OF THE INVENTION

Figure 1:
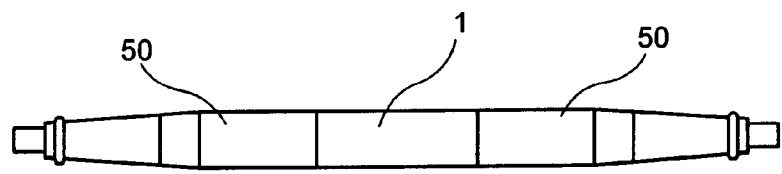
FIG. 1 is a plan view of a three-phase power cable plug-type connector of the present invention with a straight configuration.

First of all, it should be noted that like reference numerals refer to like elements in the drawings.

Figure 2:
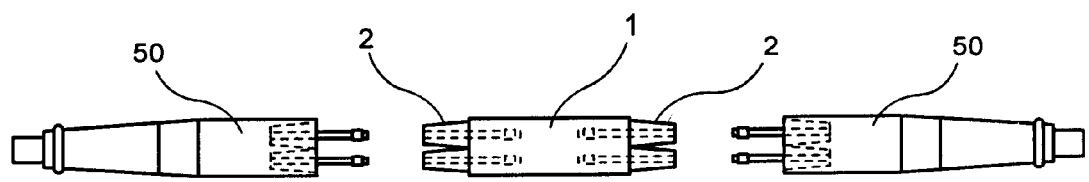
FIG. 2 is an exploded plan view of the connector shown in FIG. 1 in which plug-in bodies are detached from a head body.
Figure 3:
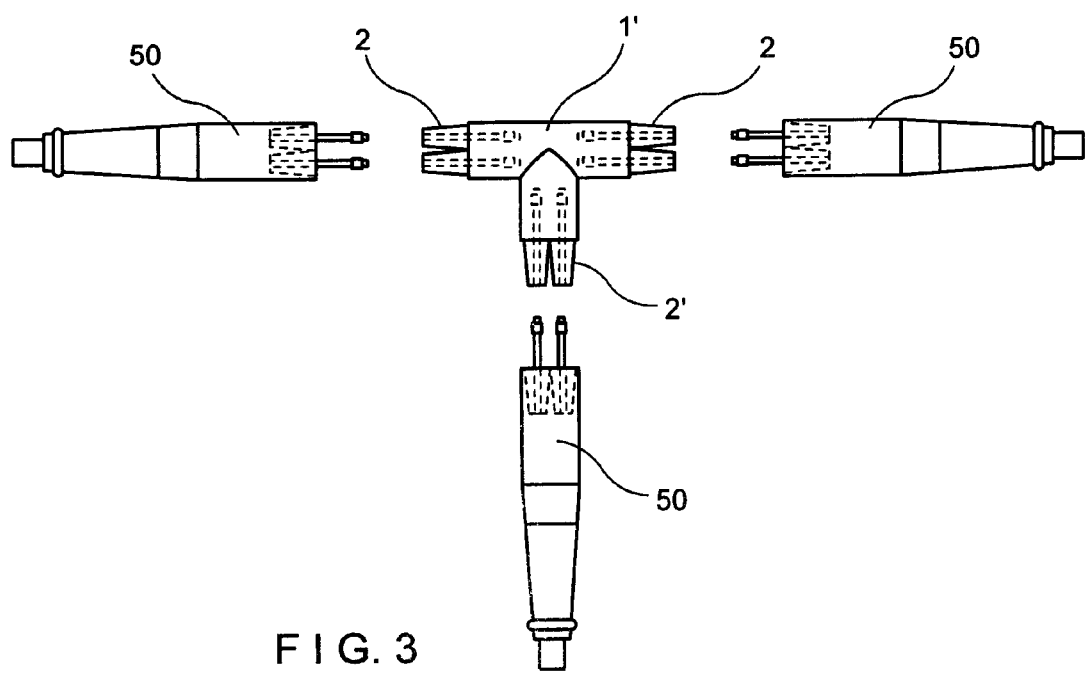
FIG. 3 is an exploded plan view of a three-phase power cable plug-type connector of the present invention with a T-shaped configuration.

Referring first to FIGS. 1 and 2, there is shown a plug type connector for three-phrase power cables which has a head body 1 with a straight configuration and two identical plug-in bodies 50 on both sides. A connector as shown in FIG. 3 has a head body 1' with a T-shaped configuration and three same plug-in bodes 50. The straight head body 1 as shown in FIG. 2 has two sockets, and the T-shaped head body 1' in FIG. 3 has an additional socket 2'. It should be noted that FIGS. 2 and 3 show only the structure for connecting two of the three phases for clarity of illustration.

Figure 4:
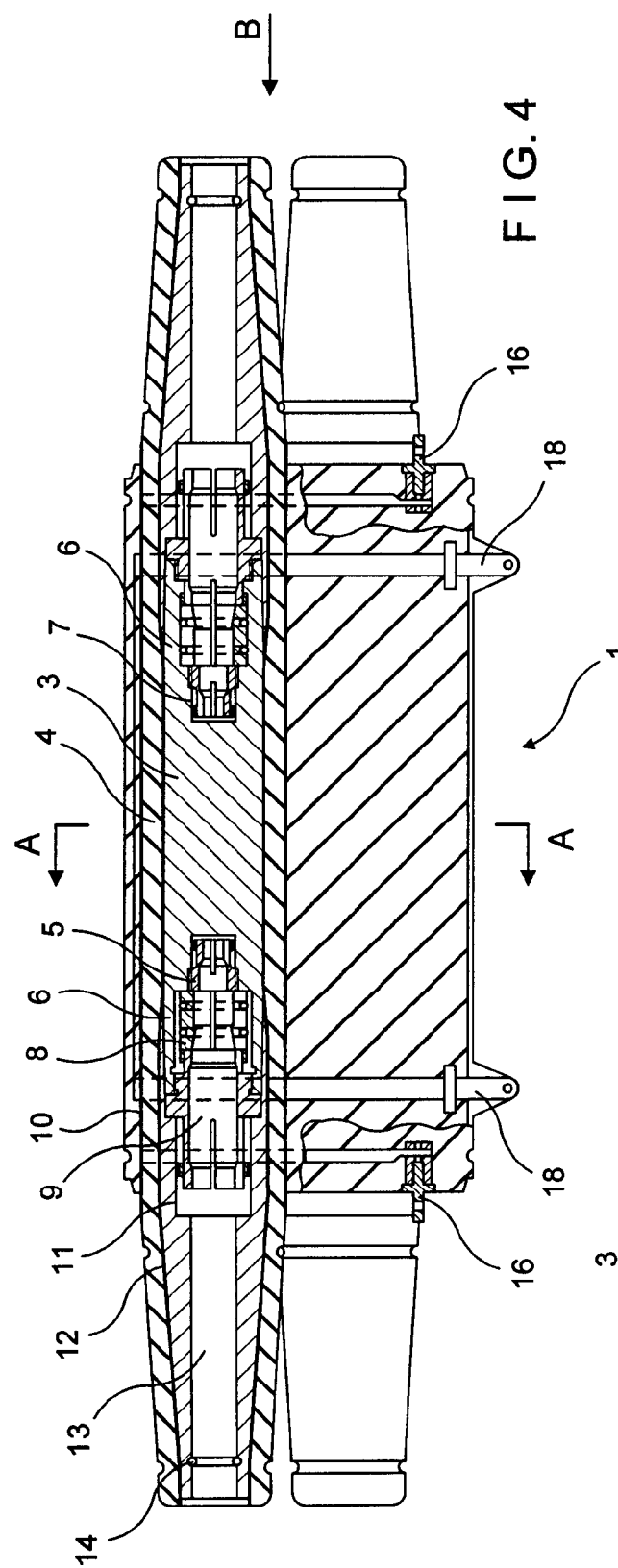
FIG. 4 is a view, partly in section, of the head body with a straight configuration.
Figure 6:
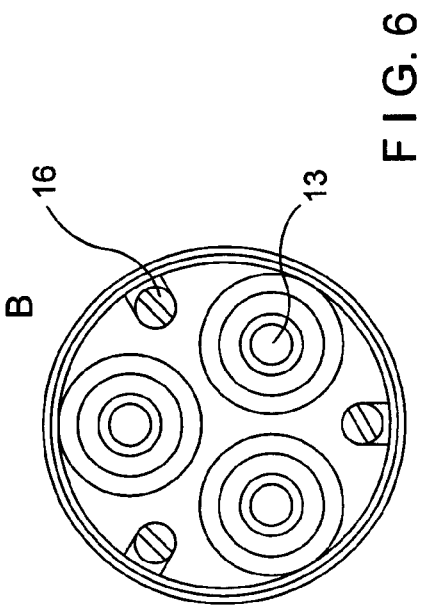
FIG. 6 is a view in the direction of an arrow B in FIG. 4.
Figure 5:
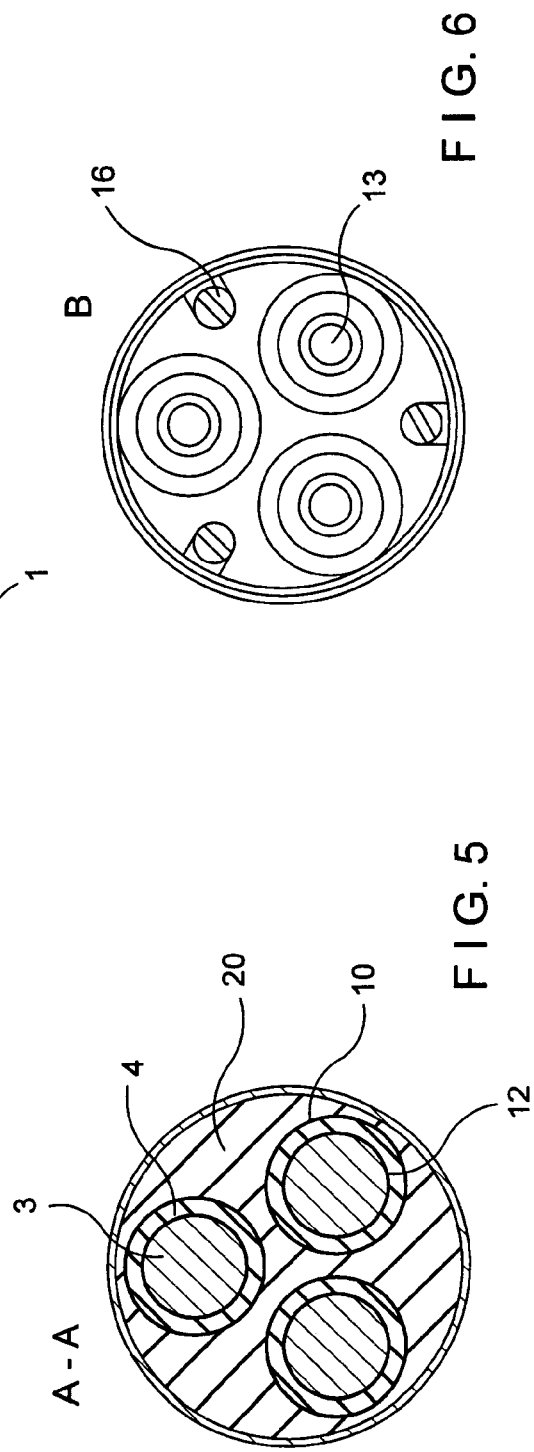
FIG. 5 is a cross-sectional view taken along line A—A of FIG. 4.

Referring to FIGS. 4–6 head body 1 comprises three intermediate conducting members 3 which are isolated from each other by means of three insulating sleeves 4 and an insulating body 20. As shown in FIG. 5, the three intermediate conducting members 3 are circumferentially even-spaced. The structure of the straight head body 1 is bilaterally symmetrical. Each intermediate conducting member 3 has at each of its ends a connecting seat 6. The connecting seat 6 and the conducting member 3 may be either manufactured into one single piece, as shown in FIG. 4, or assembled together after being individually produced. The connecting seat 6 has a strepped hole 7. The large and small holes of the stepped hole 7 are respectively provided with an internal thread section. The small hole is in threaded connection with an inner conducting gripper 5, and the large hole is in a threaded connection with an outer conducting gripper 9. An expansion sleeve 8 is disposed between the inner conducting gripper 5 and the outer conducting gripper 9 and used for axially positioning a conducting plug rod 75 (see FIG. 7) of the plug-in body 50.

Figure 12:
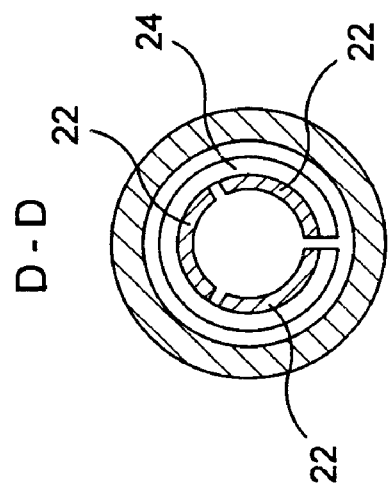
FIG. 12 is a sectional view taken along line D—D of FIG. 11.
Figure 11:
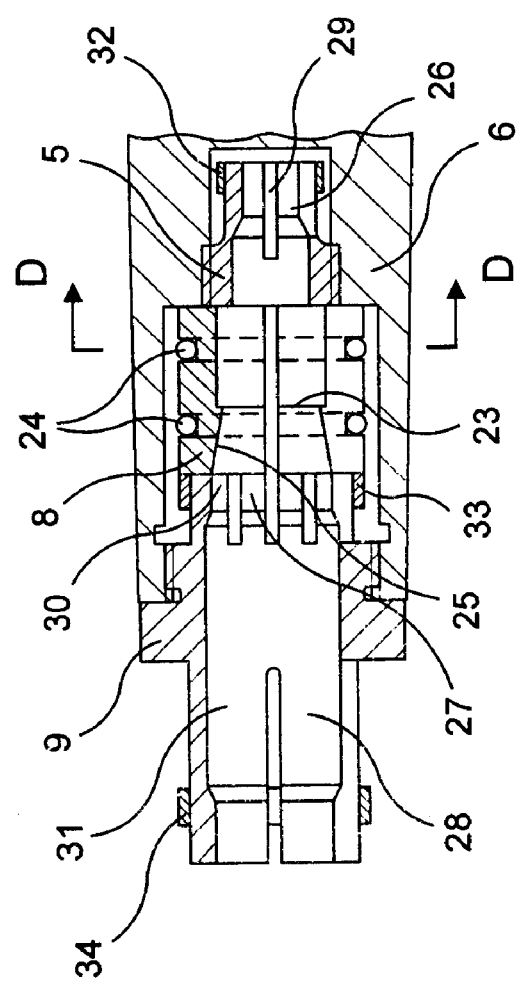
FIG. 11 is a cross sectional view of an axial locking assembly in the head body.

FIGS. 11 and 12 show specially an axial locking assembly formed from the inner conducting gripper 5, the expansion sleeve 8 and the outer conducting gripper 9 and used for axially locking the conducting plug rod 75. After the inner and outer conducting grippers 5, 9 have been engaged in a threaded connection with the connecting seat 6, the expansion sleeve 9 disposed therebetween is then axially positioned. The expansion sleeve 8 has several, such as three, curved elements 22 of which all form a tubular member. The outer surface of the tubular member is formed with grooves in which ring springs 24 are disposed such that the curved elements 22 are assembled all together to form the tubular member. A locking projection 23 and a tapered hole 25 are located inside the tubular member. When a conducting plug rod 75 is inserted into an expansion sleeve 8, the expansion sleeve 8 resists the spring forces of the ring springs 24 under the action of the plug rod 75 to expand so that the expansion sleeve is restored into a contracted state. In such contracted state, the locking projection 23 functions so that the plug rod 75 can not be pulled out, and an end face of the inner conducting gripper 5 functions so that the plug rod 75 can not be further inserted, thereby axially positioning the plug rod 75. The inner conducting gripper 5 has a jaw portion 26, and the outer conducting gripper 9 has two jaw portions 27, 28. The jaw portions 26, 27, 28 each have axial slots, thereby forming jaws 29, 30, 31 with a certain elasticity. The jaw portions 26, 27, 28 may be provided with spring members 2, 3, 4 on the outer circumferential surfaces thereof, respectively, thereby exerting prestressing forces on the gripping jaws 29, 30, 31. After the plug rod 75 is held in place, the gripping jaws 29, 30, 31 grip it tightly so that a sufficient contact area for current transfer can be reliably obtained.

As shown in FIGS. 4 and 5, the insulation of the head body is realized by means of a laminated structure. That is, insulating sleeves 4 are provided around the conducting members 3 and members connected to the conducting members 3, respectively, and an insulating body 20 is provided around all the three insulating sleeves 4. The insulating sleeves 4 and the insulating body 20 can be made of insulating rubber or plastic material. In each insulating sleeve 4, a bushing 11 made of metal such as aluminum is provided to serve to support the insulating sleeve, thereby facilitating insertion of the conducting plug rod 75. Each bushing 11 has an insertion hole 13 for inserting the plug rod 75. The insertion hole 13 has at a position adjacent to one end thereof a recess which receives an O-ring 14 made, for example, of insulating rubber. The O-ring 14 is used for sealing after the plug rod is inserted.

According to the present invention, each phase is further provided with an inner semiconductor shielding layer 12 and an outer semiconductor shielding layer 10; see FIGS. 4 and 5. The inner semiconductor shielding layer 12 is a transition layer between conducting bodies and the insulating sleeve 4, and serves the function of equalizing. The outer shielding layer 10 is used to shield induced charge of each phase, and functions as a Faraday cage. On each side of the head body 1, there are three plug connection attachments 16 for being connected with shielding connecting rods 65 (see FIGS. 7 and 9) after the plug-in body 50 has been inserted into the head body 1.

The head body 1 as shown in FIG. 4 is constructed with two sockets 2 for being connected with the plug-in bodies 50.

Figure 7:
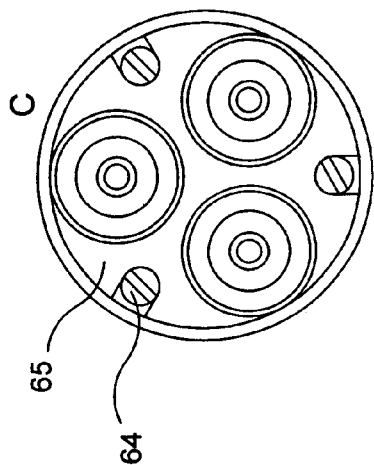
FIG. 7 is a sectional view of a plug-in body of the present invention.
Figure 9:
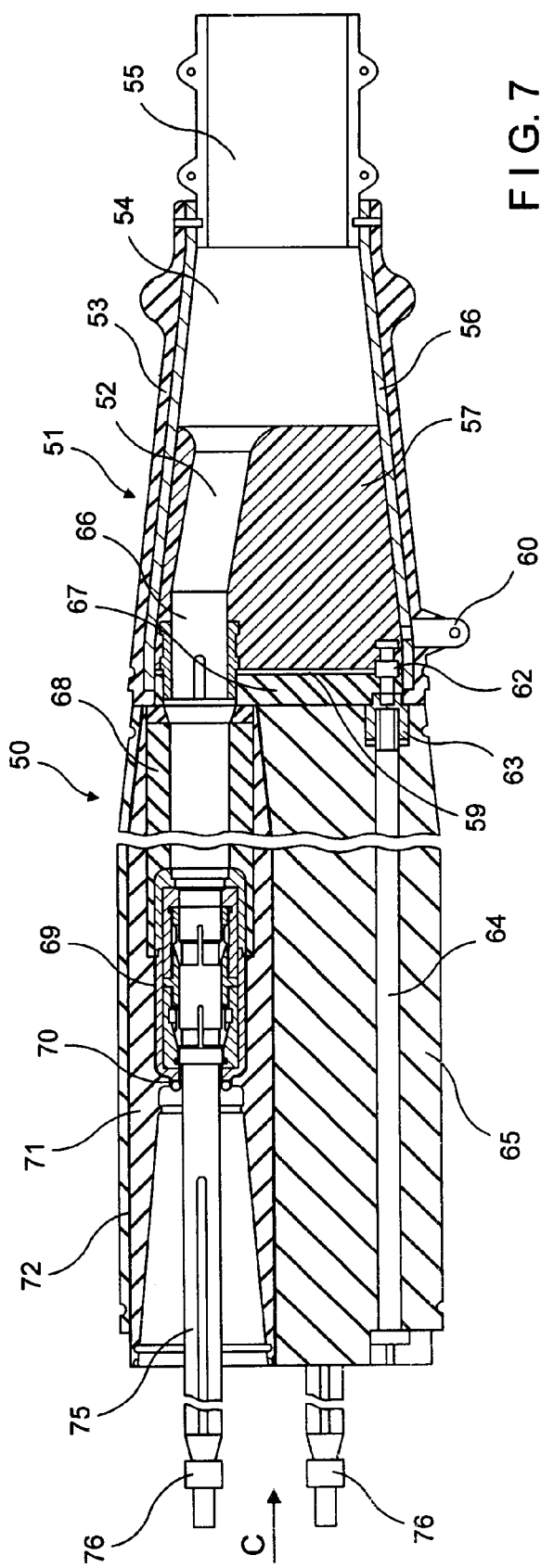
FIG. 9 is a view of the plug-in body in the direction of an arrow C in FIG. 7.
Figure 8:
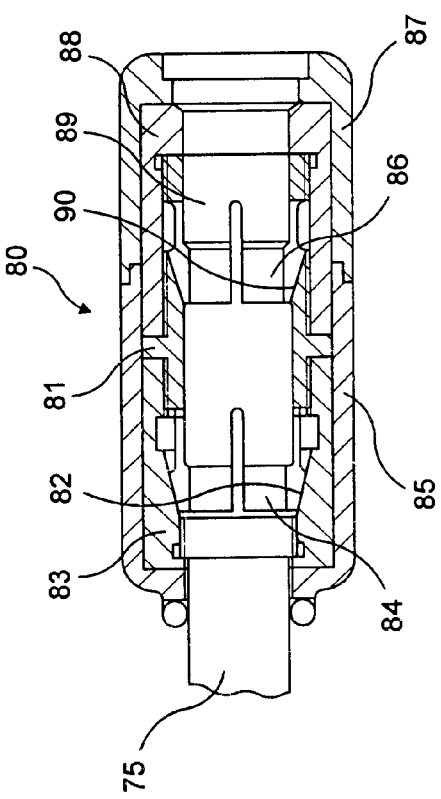
FIG. 8 is a sectional view of a locking assembly in the plug-in body.

The structure of the plug-in bodies 50 is described hereinbelow with reference to FIGS. 7–9. Each plug-in body 50 has at one end thereof a branch support sleeve 51. As shown in FIG. 7, the branch support sleeve 51 comprises: an outer insulating layer 53 made, for example, of insulating rubber; a support sleeve 56 made of metal such as aluminum, the support sleeve 56 having an opening 54 for inserting a three-phase power cable; a dividing body 57 which may be made of plastic material and has three dividing holes 52 for dividing the three-phase wires while the three-phase power cable is being inserted, each of the dividing holes having a bellmouth entrance so as to facilitate insertion of a respective cable core of the cable; a ground lug 60 being electrically connected with the support sleeve 56, and, a split clamp 55 located at an end of the sleeve 51, the split clamp 55 being connected with the outer insulating layer 53 and the support sleeve 56 and used for clamping the armoured layer of the cable and electrically connecting the armoured layer and the ground lug 60. Corresponding to the three dividing holes 52, the plug-in body 50 further comprises three conducting plug rods 71 which are circumferentially even-spaced and may be inserted in to the three insertion holes 13 of the head body. As described above, the plug rod 75 has adjacent to the front end thereof a snap portion 76 used for cooperating with the axial locking assembly of the head body 1 and locking the plug rod 75 to the head body 1. Corresponding to the three plug rod 75, the plug-in body 50 further has three electric-coupling devices 80 for connecting the three plug rods 75 to the three conducting wires of the three-phase power cable, respectively. The electric-coupling devices 80 are best shown in FIG. 8. Each electric-coupling device 80 as shown therein comprises: a front conducting sleeve seat 83 being in a threaded connection with the plug rod 75 and having a taper-bore portion 82; a clamping device 81 being in a threaded connection with the front conducting sleeve seat 83 and having a plurality of clamping jaws 84 with a certain elasticity and a taper-bore portion 90, the clamping jaws 84 coming into contact with the taper-bore portion 82 to become radially inward bent as the length of the threaded engagement of the clamping device 81 in the front conducting sleeve seat 83 increases, thereby tightly clamping a conducting wire of the cable; a clamping member 89 also having a plurality of clamping jaws 86 with a certain elasticity; a rear conducting sleeve seat 88 being in a thread connection with the clamping device 81 and the clamping member 89, the clamping jaws 86 coming into contact with the taper-bore portion 90 to become radially inward bent as the length of the threaded engagement of the clamping device 81 in the rear conducting sleeve seat 88 increases, thereby tightly clamping the conducting wire of the cable; and two locking sleeves 85 and 87 made of metal.

As in the case of the head body 1, the insulation of the plug-in body 50 is also realized by means of a laminated structure. The plug-in body 50 has three inner insulating sleeves 71 located on the inside thereof and three insulating sleeves 68 for locking and positioning the electric-coupling devices 80 in the inner insulating sleeves 71. The insulating sleeves 68 and 71 may be made of insulating rubber. The plug-in body 50 further has an outer insulating body 65 which may be made of insulating rubber.

As shown in FIG. 7, an outer shielding layer made, for example, of semiconductor rubber is provided between each inner insulating sleeve 71 and the outer insulating body 65. An inner shielding layer 69 is arranged between the locking sleeve 85 and the inner insulating sleeve 71. At one end of the inner shielding layer 69, there is mounted a semiconductor rubber gasket 70 for connecting the inner shielding layer 69 of the plug-in body 50 with the inner shielding layer 12 of the head body 1 (see FIGS. 4 and 5) after the plug-in body 50 has been inserted into the head body 1. The plug-in body 50 as shown in FIG. 7 further comprises means for interconnecting the outer shielding layers. The interconnecting means comprises: three shielding connecting rods 64 being coupled with the plug connection attachments 16 of the head body 1 after the plug-in body 50 has been inserted into the head body 1; three connecting nuts 63 and three connecting pins 62, each connecting nut 63 having at each end thereof a threaded hole, one threaded hole being in a threaded connection with the connecting rod 64 and the other threaded hole with connection pin 62; a shielding connecting plate 59 being electrically connected with the three connecting pins 62; and three branch shielding locking jaws 66 each being connected on the one hand with the shielding connecting plate 59 and on the other hand with a shielding layer of a respective phase of the cable. Adjacent to the shielding connecting plate 59, there is an insulating plate 67 for receiving and positioning the connecting nuts 63, the connecting pins 62 and the locking jaws 66. After the plug-in body 50 has been inserted into the head body 1, the outer shielding layer 10 of the head body 1, the outer shielding layer 72 of the plug-in body 50 and a shielding layer for each phase of the cable can be interconnected by the means for interconnecting the outer shielding layers in accordance with the present invention.

The outer shielding layer 10 of the head body 1 is connected with a connecting attachment 18. The ground lug 60 of the plug-in body 50 is connected with the armoured layer of the cable by means of the support sleeve 56, as described above. A conducting wire outside is used to connect the connecting attachment 18 and the ground 60, thereby effecting connection between the outer shielding layer 10 of the head body 1, the outer shielding layer 72 of the plug-in body 50 and the armoured layer of the cable.

Figure 10:
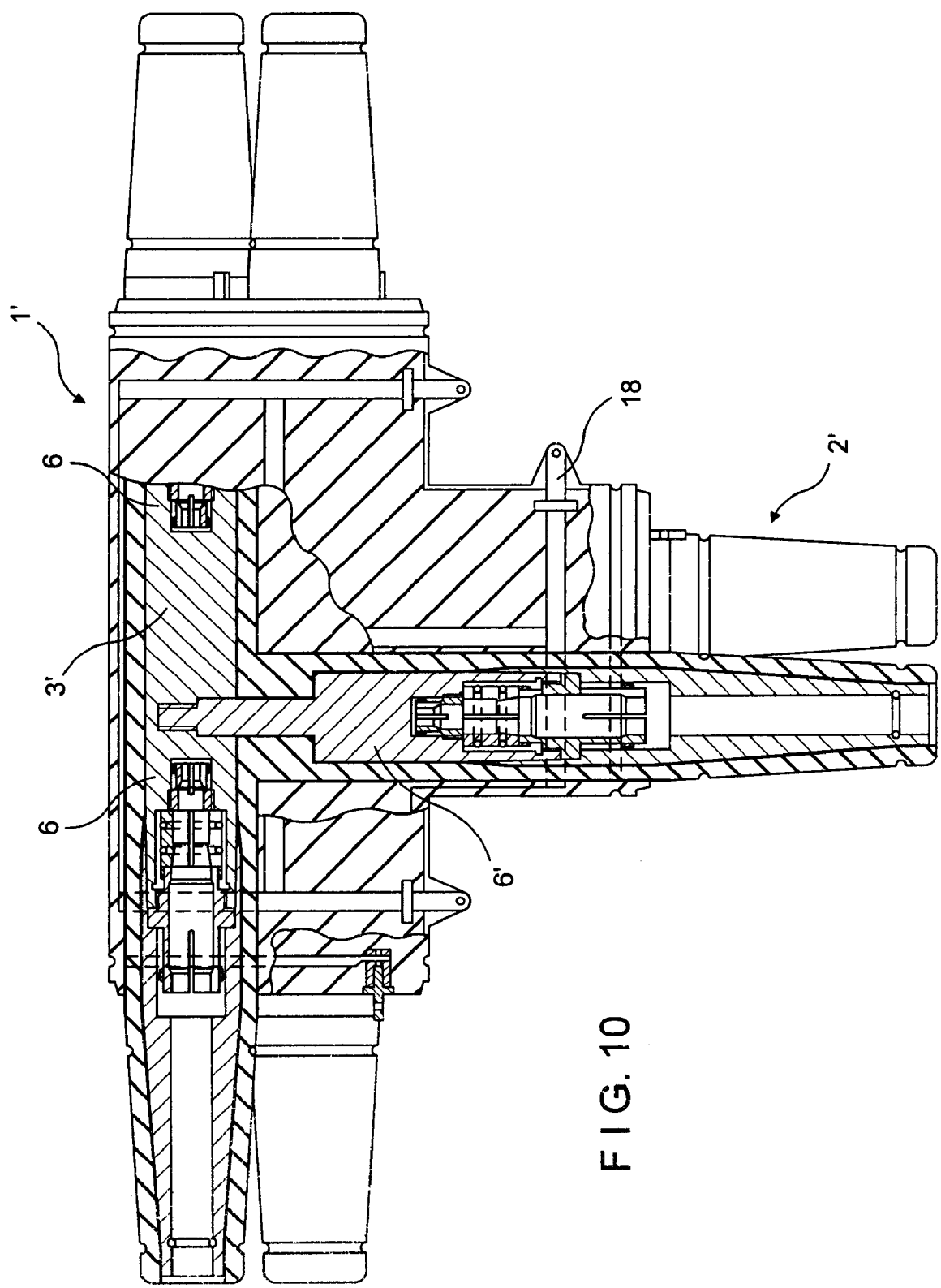
FIG. 10 is a partial sectional view of a T-shaped head body.

FIG. 10 shows a T-shaped head body 1' in accordance with the present invention. The T-shaped head body has an additional vertical socket 2' on the head body 1 as shown in FIG. 4. The vertical socket 2' differs from the sockets 2 in that the connecting seat 6' of the socket 2' and a corresponding conducting member 3' are not manufactured as one single piece but with a threaded connection.

On the basis of the present invention as described above, persons skilled in the art may easily obtain a three-phase power cable plug type connector having four or more sockets.

What is claimed is:

1. A three-phase power cable plug-type connector, comprising a head body (1; 1') having at least two sockets (2; 2'), and a plurality of plug-in bodies (50) equal in number to the number of said sockets (2; 2'), a) said head body (1; 1') having on the inside thereof three intermediate conducting members (3) which are isolated from each other by means of an insulation structure (4, 20) for electrically interconnecting conducting wires of three-phase power cables, each socket (2; 2') of said head body (1; 1') being provided therein with three insertion holes (13) which are isolated from each other by said insulating structure (4, 20), each insertion hole (13) being assigned to one of the three intermediate conducting members (3) and having at its inner end a connecting seat (6) connected to one of the intermediate conducting members (3) and an axial locking assembly;

b) said plug-in body (50) including three conducting plug rods (75) and three electric-coupling devices (80) which are isolated from each other by means of another insulating structure (68, 71), said electric-coupling devices (80) being connected with the three conducting plug rods (75) and three conducting wires of a three-phase power cable, respectively, thereby electrically conducting each plug rod (75) to its corresponding wire, said three plug rods (75) being insertable into the three insertion holes (13) of each socket (2; 2') and locket therein by the axial locking assemblies in the head body;

c) shielding layers (10, 12; 69, 72) for corresponding conducting paths of the three phases arranged in the insulating structures (4, 20; 68, 71) of the head body (1; 1') and the plug-in bodies (50); and said axial locking assembly comprising an inner conducting gripper (5), an outer conducting gripper (9) and an expansion sleeve (8) located between the inner conducting gripper (5) and the outer conducting gripper (9), said inner and outer conducting grippers (5, 9) being in threaded engagement with said connecting seat (6), and said expansion sleeve (8) which is capable of radially expanding under an external force so as to allow insertion of one of the conducting plug rods (75) therethrough for axially locking the inserted plug rod (75).

2. The three-phase power cable plug-type connector according to claim 1, wherein said plug-in body (50) further includes a branch support sleeve (51) comprising a dividing body (75) of insulating material, said dividing body (57) having three dividing holes (52) for dividing and receiving the three conducting wires.

3. The three-phase power cable plug-type connector according to claim 2, wherein said expansion sleeve (8) includes at least two curved elements (22) which form a tubular member, the tubular member having on the outer surface thereof grooves receiving ring springs (24) which tend to bias the tubular member to contract, the tubular member having on the inside surface thereof a locking projection (23) for locking the inserted plug rod (75).

4. The three-phase power cable plug-type connector according to claim 3, wherein said plug rod (75) has adjacent to its front end a snap portion (76) for engaging said locking projection (23).

5. The three-phase power cable plug-type connector according to claim 1, wherein said electric-coupling device (80) comprises: a front conducting sleeve seat (83) in threaded engagement with the plug rod (75) and having a taper-bore portion (82); a clamping device (81) being in threaded engagement with the front conducting sleeve seat (83) and having a plurality of clamping jaws (84) having a certain elasticity and a taper-bore portion (90), said clamping jaws (84) coming into contact with the taper-bore portion (82) of the front conducting sleeve seat (83) to become radially inward bent as the length of the threaded engagement of the clamping device (81) in the front conducting sleeve seat (83) increases, thereby tightly clamping a conducting wire of the cable, a clamping member (89) also having a plurality of clamping jaws (86) with a certain elasticity; a rear conducting sleeve seat (88) being in threaded engagement with the clamping device (81) and the clamping member (89), clamping jaws (86) of the clamping member (89) coming into contact with the taper-bore portion (90) of the clamping device (81) to become radially inward bent as the length of the threaded engagement of the clamping device (81) in the rear conducting sleeve seat (88) increases, thereby tightly clamping the conducting wire of the cable; and two locking sleeves (85, 87).

6. The three-phase power cable plug-type connector according to claim 1, wherein each of said dividing holes (52) has at its one end a bellmouth entrance.

7. The three-phase power cable plug-type connector according to claim 1, wherein said plug-in body (1; 1') further comprises: an outer insulating layer (65); a support sleeve (56) made of conductive metal, the support sleeve (56) having an opening (54) for inserting a three-phase power cable; a ground lug (60) electrically connected with the support sleeve (56); and a split clamp (55) located at an end of the support sleeve (56), the split clamp (55) being connected with the outer insulating layer (65) and the support sleeve (56) clamping an armoured layer of the cable and electrically connecting the armoured layer and the ground lug (60).

* * * * *